May 21, 1940.                F. KORMANN                2,201,902
                          BRAKE DEVICE FOR CYCLES
                            Filed June 28, 1938
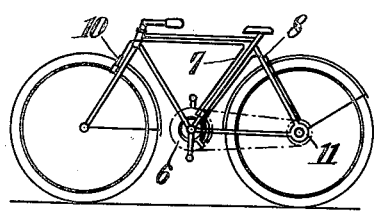
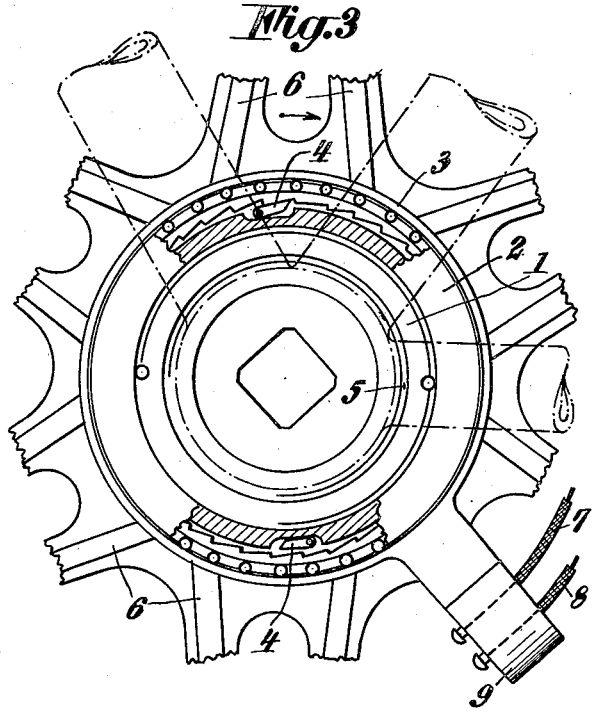
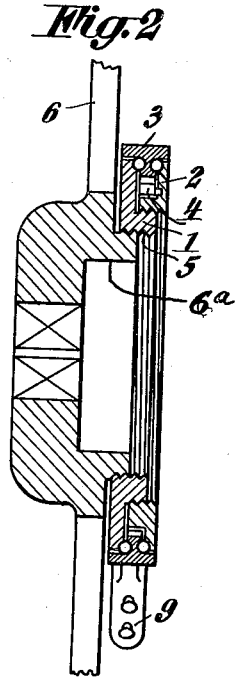
F. Kormann
Inventor
By: Glascock Downing & Siebold
Attys.

Patented May 21, 1940

2,201,902

UNITED STATES PATENT OFFICE 2,201,902

BRAKE DEVICE FOR CYCLES

Franz Kormann, Graz, Germany, assignor of one-third to Otto E. Müller, Philadelphia, Pa., and one-third to Christian Prell, Asch, Czechoslovakia Application June 28, 1938, Serial No. 216,378
In Austria July 25, 1936

1 Claim. (Cl. 192—5)

This invention relates to improvements in back pedalling brakes for cycles and similarly operated vehicles of the kind in which the chain wheel or the like, which is in rigid connection with the pedal cranks by means of the crank shaft, is provided with a ball locking or ratchet gearing which is operative in the back pedalling direction only and the ratchet wheel of which is mounted freely rotatable on the chain wheel or the like and is connected with a front wheel brake and a back wheel brake by separate Bowden cables or the like, both brakes being operated simultaneously in the moment of back pedalling in view of the operation of the pawls or balls.

The known arrangements of this kind are mounted directly on that end of the crank shaft of the pedals to which the chain wheel is not secured. Thus the drawback arises that the crank shaft of the pedals has to be made longer than the crank shaft of a common cycle. Therefore it is impossible to secure the known back pedalling brakes to a common cycle without providing it with a crank shaft of greater length, which, of course, is a drawback for subsequently fitting a back pedalling brake to a cycle of usual construction.

In back pedalling brakes of the kind above described, this drawback is overcome according to the present invention by combining the bearing rings, the ratchet wheel and the pawls to an independent ring-shaped unit of a larger inside diameter than corresponds to the outside diameter of the crank axle bearing, said unit being adapted to be secured to the chain wheel in such a manner that it surrounds the crank axle bearing.

In view of this construction neither the crank shaft nor the distance between both cranks is influenced in any way, so that the pedal cranks of the cycle remain quite unchanged in spite of the addition of the back pedalling brake.

One mode of carrying out the present invention is illustrated by way of example on the accompanying sheet of drawings in which—

Fig. 1 shows a cycle with back pedalling brake.

Figs. 2 and 3 show in cross section and in part-sectional side view respectively the back pedalling brake constructed according to the present invention.

The back pedalling brake comprises two inter-screwed bearing rings 1 and 2, an internally toothed ratchet wheel 3 which is mounted freely rotatable, preferably on ball bearings, between said bearing rings, and one or more pawls 4 which are pivotally secured to only the bearing ring 2 and, under the action of a spring, are in mesh with the toothing of the ratchet wheel 3. Thus all these parts are combined in a self-contained rim or wheel of a larger inside diameter than corresponds to the outside diameter of the crank axle bearing and which may be secured subsequently to a laterally projecting flange 6a of the hub of the chain wheel 6 of the chain drive for instance by means of a screw-threaded extension 5 on one of said bearing rings. If desired, the back pedalling brake may be fixed to the chain wheel in another manner, for instance by means of screws.

The ratchet wheel 3 is provided with a radially extending arm 9, to which the ends of two Bowden cables 7 and 8 are secured; the Bowden cables passing along the frame of the cycle to the front wheel brake 10 and to the back wheel brake 11 respectively.

The pawls 4 slide over the teeth of the ratchet wheel 3 when riding on the cycle in the ordinary way. However in the moment of pedalling back in the direction of the arrow shown in Fig. 3, the pawls 4 engage the ratchet wheel 3 and thus pull back the Bowden cables 7 and 8, thereby applying the brakes 10 and 11.

What I claim is—

A back pedalling brake for cycles comprising front and rear wheels, brake members associated with said wheels, a chain drive for one of said wheels including a toothed chain wheel, a crank axle and a bearing for said axle, a bearing ring having an inside diameter larger than the outside diameter of said bearing, means securing the bearing ring to the chain wheel on the side adjacent the bearing, a second bearing ring having screw thread connection with the first mentioned ring and forming therewith a self contained rim, an internally toothed ratchet rim rotatably mounted between the bearing rings, pawls freely movable between the rings and connected with one of the latter and engageable with the teeth of the ratchet rim to rotate the latter only in the back pedalling direction of movement of said crank axle, a radial arm on the ratchet rim, and freely accessible connections between said arm and the brake members of the front and rear wheels.

FRANZ KORMANN.